L. M. BOOTH.
FEEDING DEVICE FOR DRY CHEMICALS.
APPLICATION FILED AUG. 7, 1920.

1,390,271.

Patented Sept. 13, 1921.
2 SHEETS—SHEET 1.

L. M. BOOTH.
FEEDING DEVICE FOR DRY CHEMICALS.
APPLICATION FILED AUG. 7, 1920.

1,390,271.

Patented Sept. 13, 1921.
2 SHEETS—SHEET 2.

Inventor
L. M. Booth

UNITED STATES PATENT OFFICE.

LEVIS M. BOOTH, OF PLAINFIELD, NEW JERSEY.

FEEDING DEVICE FOR DRY CHEMICALS.

1,390,271.  Specification of Letters Patent.  Patented Sept. 13, 1921.

Application filed August 7, 1920. Serial No. 401,957.

*To all whom it may concern:*

Be it known that I, LEVIS M. BOOTH, citizen of the United States, residing at Plainfield, in the county of Union and State of New Jersey, have invented certain new and useful Improvements in Feeding Devices for Dry Chemicals, of which the following is a specification.

This invention relates to the general subject of feeders for apparatus of different kinds and has particular reference to an improved feeding device designed especially for the feeding of dry chemicals to apparatus such as water softeners, filters and other machines to which it is desirable and advantageous to feed chemicals in a dry powdered condition.

To this end the invention contemplates a simple and practical construction which provides for feeding the chemical in dry condition from a source of supply, in accurately measured quantities, to a point of use. In this connection it is proposed to provide novel means for regulating the feed of the material from the source of supply onto a moving conveyer or table whereby the amount of dry material delivered may accurately be in proportion to the amount of the liquid to be treated.

With the foregoing general object in view, and other more specific objects, that will presently appear as the description of the case proceeds, the present invention consists in the novel construction combination and arrangement of parts hereinafter more fully described illustrated and claimed.

A preferred and practical embodiment of the invention is disclosed in the apparatus illustrated in the accompanying drawings in which:—

Similar reference numerals designate corresponding parts throughout the several figures of the drawings.

Figure 1:
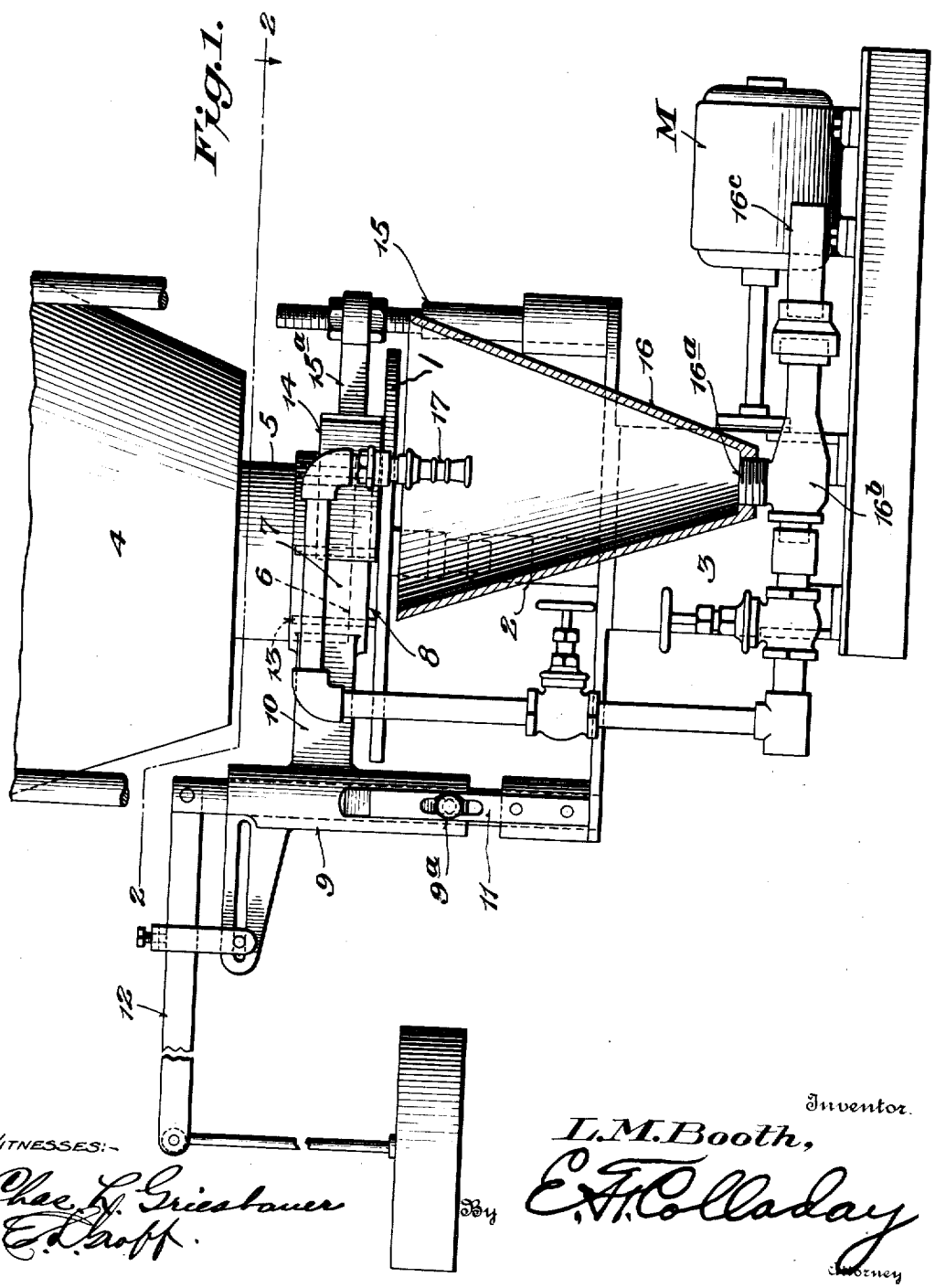
Figure 1 is an elevation, partly in section, of one form of apparatus embodying the present improvements.
Figure 2:
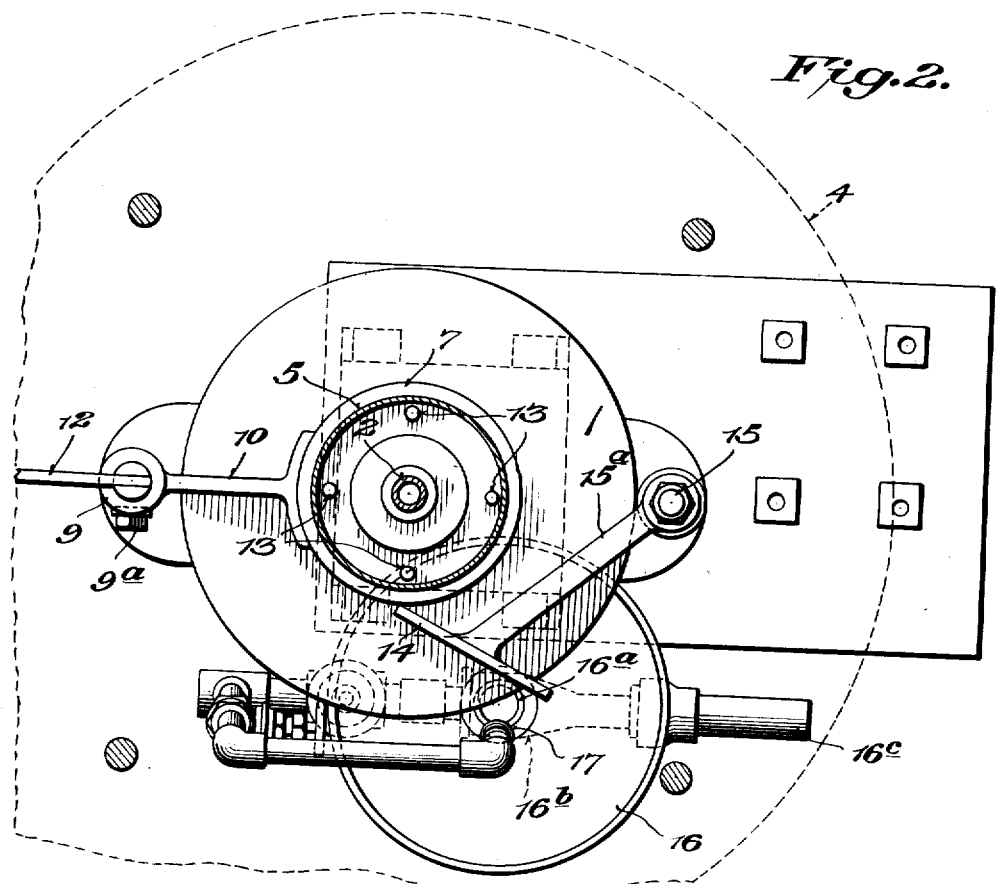
Fig. 2 is a horizontal sectional view taken on the line 2—2 of Fig. 1.
Figure 3:
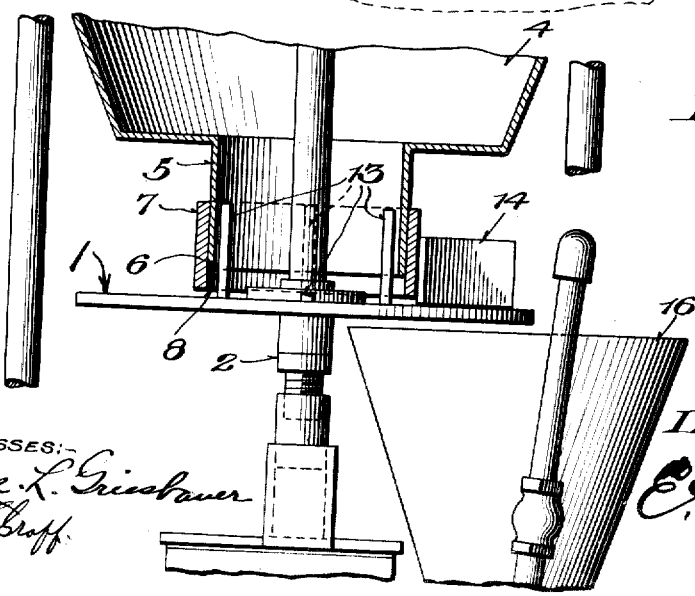
Fig. 3 is a vertical sectional view of the measuring discharge spout showing its relative location to the conveyer or table.

As already indicated the present improvement is applicable to any form of apparatus or machine to which it is desired to feed a chemical in a dry powdered condition. However, since the invention possesses special utility in its application to water softening apparatus an apparatus of that type is selected as one of the preferred examples of the application of the invention. It is quite important in water softening devices, and analogous machines employing a chemical that the feeding device have the capacity and facility for properly feeding proportional amounts of chemical in a dry state, and a device of that kind possesses important practical advantages mechanically over apparatus wherein provision is made for using the chemical in solution. The present invention is therefore addressed primarily to an apparatus designed especially for feeding properly measured quantities of the chemical in the dry state to the desired point of use.

Accordingly in carrying the present invention into effect it is proposed to provide a novel unit of construction comprising means for supplying the dry chemical in a measured quantity proportional to the amount of water to be treated and directly transferring and distributing the chemical regularly and positively to the point of use. This unit of construction includes an adjustable feeding member combined with an element for receiving the measured quantity of powdered material and discharging it to the point of use. This unit of construction necessarily is associated with other novel features of construction incorporated in a working device of the type set forth in the accompanying drawings. In this embodiment a rotatable conveyer table is supported on a shaft 2 adapted to be driven by a motor M through suitable reduction gearing housed within the casing 3. The said table 1 constitutes the means for receiving the powdered chemical contained in the hopper 4, supported above the table position and having the fixed discharge spout 5 whose lower edge 6 forms the upper edge discharge orifice from the source of supply, located a predetermined distance above the surface of the table 1.

The spacing of the lower edge 6 of the discharge spout above the table 1 is sufficient to allow a maximum amount of powdered chemical to escape onto the table, considering the capacity of the latter and the requirements of the machine. Therefore, the fixed end 6 of the discharge spout 5 defines the maximum outlet opening for the powdered chemical, and, in order to vary the size of this outlet and control the quantity of powdered chemical issuing therefrom, it is proposed to provide a novel feeding collar 7. This feeding collar 7 surrounds the discharge pipe 5 and is vertically adjustable so that the lower edge 8 thereof may be located at variable distances from the surface of the table 1.

The collar 7 may be automatically raised and lowered or manually set at a predetermined position if the capacity of the apparatus is constant. In the form of the apparatus shown in Fig. 1 of the drawings the position of the collar may be automatically adjusted through the medium of the supporting bracket 9 connected with the collar by means of an arm 10, and which bracket 9 may be slidably supported on the vertical standard 11 whereby the same may be controlled through the medium of suitable connections 12 associated with a float that rises and falls with the level of liquid in the raw water tank, in the case where the feeder is associated with a softener apparatus. When adjusted and set manually the adjustable supporting bracket 9 may be conveniently held fast in its adjusted position by means of the bolt or equivalent device $9^a$.

Therefore, it will be apparent that the outlet between the source of chemical supply and the table 1 may be varied to permit of measured quantities of the material to be delivered to the table continuously during the rotary movement of the latter.

The table 1 preferably has associated therewith the upstanding agitating fingers 13 projecting upwardly in the discharge spout 5 and operating therein to facilitate its free and loose flow through the outlet beneath the lower edge of the feeding collar. Also the said table has combined therewith a scraper blade 14 which is adapted to be held in a relatively fixed position tangential to the feeding collar 5 and extending from such collar across the surface of the table to the outer periphery thereof so as to lie in the path of the dry chemical carried upon the surface of the rotating table. The said scraper blade may be mounted in any suitable manner that will properly support it in accurate relation to the table and the feeding collar but one way in which the scraper blade may be conveniently held in place is shown in the drawings in which is illustrated a standard 15 upon which is mounted the bracket arm $15^a$ carrying the scraper blade 14. It will be seen, from the construction described and by reason of the blade being positioned in a plane tangent to the feed collar it will direct all of the material between the collar and the periphery of the table over the edge of the latter to the point of use. In the illustrative embodiment this delivery or discharge of the dry chemical may be directed into a delivery hopper 16 having an outlet connection at $16^a$ with the ejector $16^b$ of the line $16^c$. Also there may be associated with the element 16 a water jet nozzle 17 connected with the water line and serving to assist the introduction of the chemical into the line.

In the operation of the device the speed of the table is fixed in accordance with the particular size of the equipment employing the invention, the speed varying in some instances from $\frac{1}{2}$ revolution to 8 revolutions per minute, but for any given machine the speed of the rotation for the feed table is constant. Obviously this may be definitely determined by fixing the gear ratio for driving the table, or by other similar means. And, as the table revolves, the agitating fingers 13 assist in uniformly removing the powdered chemical from the discharge spout 5 so that it may freely make its exit through the outlet afforded between the surface of the table and the lower edge of the feed collar 7. As the dry powder flows out from beneath the feed collar it assumes the formation of the frustum of a cone, and as the table revolves the scraper 14 will remove the material deposited thereon into the hopper 16 or other point of use.

From the foregoing it is thought that the construction and operation of the improved feeding device will be understood by those familiar with the art without further description and it will be understood that various changes in the form, proportion and minor details of construction may be resorted to without departing from the spirit or sacrificing any advantages of the invention.

I claim:—

1. A device for feeding dry chemicals including a rotary measuring surface, a source of powdered chemical supply having a discharge orifice located at a predetermined distance above the said surface, and an adjustable element for varying the outlet for the material to the said rotating surface.

2. A device for feeding dry chemicals including a rotary table, a supply hopper having a discharge orifice located at a fixed distance above said table, separate means for varying the outlet for the material to the table, and means for removing the chemical from said table.

3. A device for feeding dry chemicals including a rotary table, a supply hopper having a discharge orifice located at a fixed distance above said table, separate means for varying the clearance between the outlet of the supply hopper and the table, and a scraper blade extending across the table surface for removing the powdered chemical from the said table.

4. A device for feeding dry chemicals including a rotary table, a supply hopper, a discharge spout for the hopper having its lower edge positioned a fixed distance above the table, a collar supporting said discharge spout, means for adjustably supporting said collar, and a scraper blade supported in a fixed position above the table to direct the dry chemical over the periphery of said table.

In testimony whereof I hereunto affix my signature in the presence of two witnesses.

LEVIS M. BOOTH.

Witnesses:
 EMORY L. GROFF,
 ADA J. COOPER.

Certificate of Correction.

It is hereby certified that in Letters Patent No. 1,390,271, granted September 13, 1921, upon the application of Levis M. Booth, of Plainfield, New Jersey, for an improvement in "Feeding Devices for Dry Chemicals," an error appears in the printed specification requiring correction as follows: Page 3, line 5, claim 4, for the word "supporting" read *surrounding;* and that the said Letters Patent should be read with this correction therein that the same may conform to the record of the case in the Patent Office.

Signed and sealed this 20th day of June, A. D., 1922.

[SEAL.]
KARL FENNING,
*Acting Commissioner of Patents.*